Patented June 4, 1935

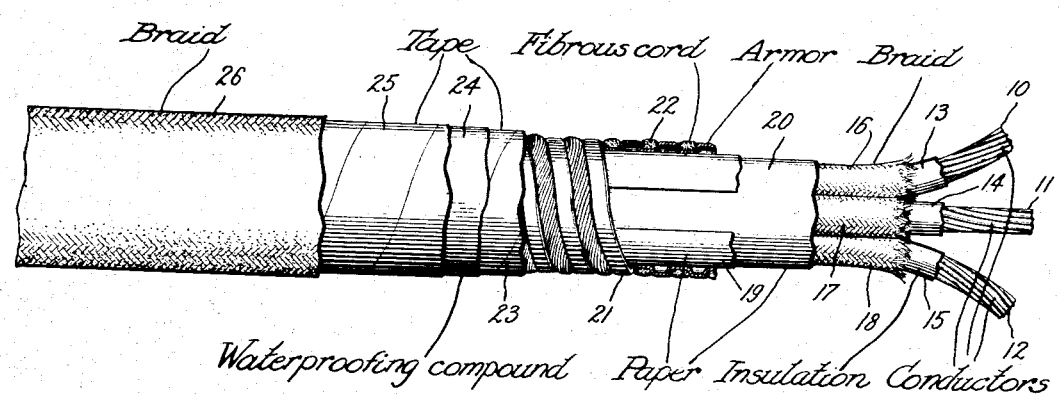

2,003,991

UNITED STATES PATENT OFFICE 2,003,991

WEATHERPROOF ARMORED CABLE

George Carlson, Bridgeport, Conn., assignor to General Electric Company, a corporation of New York Application April 1, 1933, Serial No. 663,971

3 Claims. (Cl. 173—267)

My invention relates to an improved weatherproof armored cable.

In connecting a house wiring system to the power supply lines it has been a common practice to pass the conductors through a rigid conduit from some point near the top of the house where they are connected to the power supply, down the side of the house to an opening in the wall communicating with the cellar. Such an arrangement is a relatively expensive installation and requires a special fitting at the top of the rigid conduit to exclude moisture therefrom. In addition, this rigid conduit is inflexible and the cost of material necessary for the installation is high. In a number of localities it has been discovered that persons would make holes in this rigid conduit at points not readily discoverable and take current from the conductors located therein. The theft of current in this manner has been of increasing magnitude and represents a considerable loss to the power companies.

The object of my invention is to provide an improved weatherproof armored cable which is flexible, easy to install, highly resistant to atmospheric conditions and increases the difficulty with which access to the conductors may be obtained for the theft of electric current.

What I consider to be novel and my invention will be better understood by reference to the following specification and appended claims, when considered in connection with the accompanying drawing.

In the accompanying drawing, my improved cable is shown in elevation with different layers of covering removed to expose the layers beneath.

My improved cable is provided with separately insulated conductors cabled together and covered with an interlocked armor. The cable is provided with a moisture proof covering wholly outside the armor. The weatherproof covering is provided outside the armor to prevent its adhering to the conductors and their insulation and interfering with the stripping of the ends of the conductors. In addition, the weatherproof covering is spaced from the armor so it will not stick to the armor and prevent a good ground connection being made to it.

Referring to the drawing, 10, 11 and 12 are copper conductors consisting of strands of copper wound together spirally to form cores. Conductors 10, 11 and 12 are provided with a rubber insulation 13, 14 and 15 and cotton braid 16, 17 and 18. To distinguish the conductors from each other a white cotton braid is used and the braid on one of them is impregnated with a colorless wax and the braid on the other two is impregnated with a colored wax, preferably one with a red wax and the other with a black wax. In the drawing, the conductors are shown extending longitudinally of each other but this is only for convenience in illustrating the cable. In practice, the conductors will be twisted together spirally to increase the flexibility of the cable. Over the combined conductors 10, 11 and 12 two strips of paper 19, 20 are placed longitudinally, one strip overlapping the other with the open edges on opposite sides of the cable. Over the combined conductors and overall paper insulation an interlocked armor 21 is provided. This armor provides mechanical protection for the cable and at the same time protects the conductors from the theft of electric current therefrom. It is not expected that this armor will make the cable wholly theft-proof but it increases the difficulties which have to be overcome in order to take current from the conductors except in the usual way. It is to be noted that the spiral winding of the conductors together assists in making the cable difficult of access in this respect as well as increasing the flexibility of the cable. A moisture-proofed fibrous cord 22 is wound about the armor in the hollows between adjacent spirals of the armor strip to prevent moisture entering into the cable through the spaces between the adjacent spirals and also to make the cable surface smooth. Over the armor and fibrous cord a layer 23 of rubber filled tape is wound spirally. Over the layer 23 of rubber filled tape a layer of waterproofing compound 24, such as an asphaltic compound, is provided to waterproof the cable. This layer of asphaltic compound provides the major weatherproofing for the cable although the rubber filled tape 23 and moisture-proofed fibrous cord 22 assist in a measure. The rubber filled tape 23 while it assists in weatherproofing the cable primarily serves as a separator between the asphaltic compound and the armor and remainder of the cable. The asphaltic compound is a very sticky substance which would readily permeate the whole cable unless some separator is provided. If this asphaltic compound came in direct contact with the armor it would thoroughly cover the armor and thus greatly interfere with any ground connection being made to the armor. It is for this reason that the asphaltic compound is not provided beneath the armor because it would impregnate the conductors and make it more difficult to make a connection to them. In place of the rubber tape 23, it may be satisfactory to use a paper strip or other fibrous material to serve as a separator. Over the layer 24 of asphaltic compound a layer 25 of rubber filled tape is provided. This layer 25 prevents the asphaltic compound from adhering to any other covering which may be applied over the cable. An overall heavy cotton braid 26 is provided and may be impregnated with flameproof saturant such as stearin pitch. The weatherproofing of the cable is provided by the layer of asphaltic compound 24, layers 23 and 25 of rubber filled tape, and the fibrous cord 22 in the interstices of the spirals of armor 21. It is to be noted particularly that the weatherproofing of the cable is provided wholly without the armor. This greatly facilitates the baring of the ends of the conductors when it is desired to connect the cable to the power supply at one end and to the service switch in a house at the other end.

From the foregoing it will be seen that an improved flexible weatherproof cable is provided which is easy to install, of relatively low cost of manufacture, and provides protection against the theft of electric current from the conductors.

What I claim as new and desire to secure by Letters Patent of the United States, is:

1. In an electric cable, a plurality of electric conductors, a covering of insulating material for each conductor, a spiral interlocked armor surrounding the conductors, a cord of fibrous material in the hollow between adjacent spirals, a rubber filled tape on the armor, a layer of asphaltic compound covering the rubber filled tape, a second rubber filled tape located over said compound, and an overall braid impregnated with a flame proof saturant.

2. In an electric cable, a plurality of electric conductors, a covering of insulating material for each conductor, an overall covering of paper for the conductors, an armor surrounding the conductors, a cord of fibrous material in the hollow between adjacent spirals of the armor, a rubber filled tape wound spirally about the armor, a layer of asphaltic compound over the tape, a second layer of rubber filled tape wound spirally over the first, and an overall cotton braid impregnated with a flameproof saturant.

3. In an electric cable, a plurality of electric conductors, a covering of insulating material for each conductor, a spiral armor surrounding the conductors, a rubber filled tape on the armor, a layer of asphaltic compound covering the rubber filled tape, a second rubber filled tape located over said compound, and an overall braid impregnated with a flameproof saturant.

GEORGE CARLSON.